United States Patent [19]
Troska et al.

[11] Patent Number: 5,932,648
[45] Date of Patent: Aug. 3, 1999

[54] LOW VOC, HIGH SOLIDS FUMIGATION ADHESIVE COMPOSITION

[75] Inventors: James Louis Troska, Costa Mesa, Calif.; Larry McArthur Kegley, League City, Tex.; William Brian Dances, Ontario, Calif.

[73] Assignees: Shell Oil Company, Houston, Tex.; AC Products, Placentia, Calif.

[21] Appl. No.: 08/712,402

[22] Filed: Sep. 11, 1996

Related U.S. Application Data

[60] Provisional application No. 60/003,851, Sep. 15, 1995.

[51] Int. Cl.⁶ ............................................ C08L 53/02
[52] U.S. Cl. .................. 524/505; 524/271; 524/274; 524/499; 525/98; 525/99
[58] Field of Search ........................ 524/271, 274, 524/499, 505; 525/98, 99

[56] References Cited

U.S. PATENT DOCUMENTS

| | | | |
|---|---|---|---|
| H1622 | 12/1996 | Himes | 525/98 |
| 3,519,585 | 7/1970 | Miller | 524/505 |
| 4,080,348 | 3/1978 | Korpman | 524/505 |
| 4,101,482 | 7/1978 | Doss et al. | 524/271 |
| 5,274,036 | 12/1993 | Korpman et al. | 525/92 |
| 5,534,583 | 7/1996 | Roberts et al. | 524/499 |
| 5,719,226 | 2/1998 | Kegley | 525/99 |

*Primary Examiner*—Peter A. Szekely
*Attorney, Agent, or Firm*—Donald F. Haas

[57] ABSTRACT

A low viscosity, low VOC content fumigation adhesive formulation which is comprised of a) 100 parts by weight (pbw) of a blend of a styrene-diene triblock copolymer, hydrogenated or unhydrogenated, having a weight average molecular weight of 30,000 to 200,000 and a polystyrene content of from 10 to 40% by weight of the polymer, and a styrene-diene diblock copolymer having a weight average molecular weight of 10,000 to 40,000 and a polystyrene content of from 10 to 40% by weight of the polymer, wherein the diblock comprises from 60 to 95% by weight of the polymer blend, b) 75 to 275 parts by weight (pbw) of a tackifying resin which is compatible with the diene blocks, and c) 50 to 200 parts by weight (pbw) of a solvent for the polymer.

In its preferred embodiment, the invention is the use of SI diblock polymer with a much smaller amount of conventional SEBS or SEPS triblock polymer to produce an extremely low viscosity product which can be processed in the type of equipment presently in use by fumigation adhesive manufacturers and satisfies the VOC standard of 250 grams per liter or less.

34 Claims, No Drawings

LOW VOC, HIGH SOLIDS FUMIGATION ADHESIVE COMPOSITION

CROSSREFERENCE TO RELATED APPLICATIONS

This application claims the benefit of U.S. Provisional Application No. 60/003,851, filed Sep. 15, 1995.

FIELD OF THE INVENTION

The invention described herein relates to low viscosity high solids content fumigation adhesive compositions which have a low volatile organics content (VOC) and have good adhesive strength. More particularly, this invention relates to the use of particular low viscosity diblock block copolymers in combination with conventional triblock block copolymers in fumigation adhesive formulations to achieve high solids, low VOC, and good strength.

BACKGROUND OF THE INVENTION

Block copolymers have been employed in adhesive compositions for many years, primarily because of their high cohesive strengths and their ability to phase separate and form physical associations which act as crosslinks which are normally formed by chemical vulcanization. Block copolymers such as those described in U.S. Pat. No. 3,239,478 are either linear or multiarm polymers including radial or star styrene-butadiene or styrene-isoprene block copolymers. These polymers generally have high cohesive strength and can be readily tackified to yield good adhesive properties.

Diblocks have been used to increase tack (Korpman U.S. Pat. No. 4,080,349) and die cuttability (Miller U.S. Pat. No. 3,519,585) for some time. The diblock weight average molecular weight was equal to or greater than 50 percent of the weight average molecular weight of the triblock copolymer. Many of the early triblock copolymers contained 20 percent diblock because the coupling agents used were only 80 percent efficient. Now with the use of low molecular weight diblocks and the ability to put unsaturated diblocks with saturated triblocks, a significant reduction in viscosity may be obtained.

When one hydrogenates a diblock or a triblock copolymer, there is an upward step change in viscosity. For instance, a blend of 70 percent of a hydrogenated diblock and 30 percent of a hydrogenated triblock copolymer does have a solution viscosity in toluene @ 25° C. of about 200 cps. When you replace the hydrogenated diblock with an unhydrogenated diblock, the viscosity is reduced to less than 100 cps which allows a formulation containing the polymer blend to meet the viscosity standard described herein. This blend of 30 percent SEBS (styrene-hydrogenated butadiene-styrene) and 70 percent SI (styrene-isoprene) will still give a polymer system that will impart good weatherability to the fumigation adhesive formulation, as good as or almost as good as the formulation wherein the diblock is hydrogenated. This is a very surprising and very significant discovery since the viscosity of the formulation with an unhydrogenated diblock is much lower than the formulation with a hydrogenated diblock.

All diblocks with weight average molecular weights equal to or less than the total weight average molecular weight of the triblock copolymer can be added to the corresponding triblock to reduce viscosity. However, the addition of a low molecular weight diblock reduces the viscosity much more quickly and to a much greater extent than higher molecular weight diblocks. Also, low molecular weight unsaturated diblocks are more efficient.

Fumigation adhesives were first developed from styrene-butadiene block polymers in the late 1960's. At that time the standard formulation consisted of a partially hydrogenated rosin ester tackifying resin and KRATON® D-1101 polymer. Subsequent development took place in the early 1970's where the formulations in the marketplace changed from SBS (styrene-butadiene-styrene) to SIS (styrene-isoprene-styrene) and were based on a styrene-isoprene triblock copolymer and a $C_5$ tackifying resin. All of these products are relatively low in solids to keep the viscosity low enough for processing. Later as hydrogenated block copolymers were introduced and products developed for fumigation were designed with a hydrogenated polymer plus hydrogenated tackifying resin to give better weatherability. These fumigation adhesives are used for bonding polyethylene to polyethylene so the polyethylene can be stretched over strawberries, etc. and fumigated with the polyethylene holding the fumigant into the ground for approximately two to three weeks.

More recently, the Southern California Air Quality Management District has changed the VOC requirements in Southern California to allow only 250 VOC units or less which in these formulations is approximately 65 weight percent solids. Consequently none of the present formulations in commercial use at the present time have as much as 65 weight percent solids and in fact do not meet the Southern California VOC requirements. Such high solids content is in conflict with the need of the user to keep the solution viscosity (in toluene @ 25° C.) of the formulation at 300 cps or less.

Thus, it can be seen that there is a need for polymers which can be used to produce adhesives with a better balance of properties, e.g. to be able to retain good adhesive properties and have lower viscosities at high solids content so they can meet these stringent VOC standards and still satisfy the need for a viscosity of no more than 300 cps. As will be seen below, the present invention helps to satisfy that need.

SUMMARY OF THE INVENTION

The present invention provides a low viscosity, low VOC fumigation adhesive composition having at least 65% by weight solids which is comprised of a) 100 parts by weight (pbw) of a blend of a styrene-diene triblock copolymer, hydrogenated or unhydrogenated, having a weight average molecular weight of 30,000 to 200,000 and a polystyrene content of from 10 to 40% by weight, and of a styrene-diene diblock copolymer having a weight average molecular weight of 10,000 to 40,000 and a polystyrene content of from 10 to 40% by weight, wherein the diblock comprises from 60 to 95% by weight, b) 75 to 275 parts by weight (pbw) of a tackifying resin which is compatible with the diene block (also sometimes referred to as the rubber block), and c) 50 to 200 parts by weight (pbw) of a solvent for the polymer, preferably 100 to 150.

This fumigation adhesive composition will have a VOC content of 250 grams per liter or less and thus will meet the southern California Air Quality Management District requirement. Furthermore, the solution viscosity in toluene @ 25° C. of the adhesive will be 300 cps or less. In its preferred embodiment, the invention is the use of SI diblock polymer with a much smaller amount of conventional SEBS hydrogenated triblock polymer to produce an extremely low viscosity product at a given solids content and/or a high solids product with a low enough viscosity to allow it to be processed in the type of equipment presently in use by fumigation adhesive manufacturers which still meets the southern California AQMD VOC requirements of 250 grams per liter or less.

DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear or multiarm including star or radial.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as a solid such as a crumb, a powder, a pellet or the like. When polymerized to low molecular weight, it may be recovered as a liquid such as in the present invention. Polymers containing ethylenic unsaturation and polymers containing both aromatic and ethylenic unsaturation are available commercially from several suppliers.

In general, the polymers of this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

$$RLi$$

wherein R is an aliphatic, cycloaliphatic, alkyl-substituted cycloaliphatic, aromatic or alkyl-substituted aromatic hydrocarbon radical having from 1 to 20 carbon atoms.

Suitable solvents for both the polymerization and manufacture of the adhesive formulation include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like. Hexane/acetone blends are preferred for use in the formulation because they allow the formulation to be higher in solids and these blends have a relatively fast evaporation rate.

The block polymers of the present invention are linear in nature and may be produced by coupling or by sequential polymerization. Sequential polymerization basically involves first anionically polymerizing the A block, then anionically polymerizing the B block on the end thereof, and then anionically polymerizing another A block on the end of that polymer.

In general, the method described is used to prepare coupled polymers with any polymer containing a reactive end group which will react with one or more functional groups contained in the selected coupling agent. The method is particularly suitable for the preparation of coupled polymers from so-called "living" polymers containing a single terminal metal ion. As is well known in the prior art, "living" polymers are polymers containing at least one active group such as a metal atom bonded directly to a carbon atom. "Living" polymers are readily prepared via anionic polymerization.

Conjugated dienes which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The triblock polymers of the present invention should have a weight average molecular weight of from 30,000 to 200,000 because a molecular weight of 30,000 is required for the adhesive to have sufficient strength or tack (depending upon the type polymers) and if the molecular weight is much higher than 200,000, it will be very difficult if not impossible to keep the viscosity at 300 cps or less. The triblock polymers may be unhydrogenated or hydrogenated and they may also contain varying amounts of diblock left over because of the inefficiency of the coupling process (for instance, one commercially available SIS block copolymer is known to contain 15 to 20% of its diblock and a commercially available SEBS block copolymer is known to contain 70% of its diblock—both may conceivably be used as the triblock in the present invention).

The triblock polymers are a minor component of this composition in order to keep the viscosity as low as possible. The range of concentration is from 5 to 40% by weight of the polymer blend, preferably 15 to 25%, if the triblock is unsaturated and its molecular weight is not greater than 125,000. However, if the unsaturated triblock molecular weight is greater then 125,000, then more diblock must be used in order to meet the viscosity requirement. In this case, the triblock content may range only from 5 to 20%. The polystyrene content (PSC) of the triblock should be in the range of 10 to 40% by weight of the polymer blend because at lower levels, there is insufficient strength and at higher levels, the viscosity will be too high. The preferred PSC is from 15 to 30%.

The diblock copolymers should have a weight average molecular weight of from 10,000 to 40,000 in order to keep the viscosity low and still have a sufficient amount of polystyrene and polystyrene block molecular weight to form end blocks which will form a network to make the adhesive strong enough. The diblock polymers are a much larger component of the composition because of their affect on the overall viscosity. Their concentration may range from 60 to 95% by weight of the polymer blend, preferably 75 to 85%, when the triblock is unsaturated and its molecular weight is not above 125,000. If the triblock is unsaturated and its molecular weight is greater than 125,000, then from 80 to 95% of the blend must comprise the diblock. The polystyrene content (PSC) of the diblock should in the range of 10 to 40% by weight of the polymer blend because at lower levels, there is insufficient strength and at higher levels, the viscosity will be too high. The preferred PSC is from 15 to 20%.

It is important to note that the molecular weight has an effect on the amount of diblock which is necessary. If the polymers are low in molecular weight, then the viscosity will be lower and less diblock is necessary to meet the viscosity standard and also a higher solids content can be tolerated during processing of the formulation. The type of polymer will also have an effect on the operable molecular weight ranges for these polymers. If the triblock and/or the diblock are hydrogenated, then the molecular weight range is lower because of the viscosity limitations—hydrogenated polymers have a higher viscosity than equivalent unhydrogenated polymers. The molecular weight range for hydrogenated triblocks is preferably 20,000 to 60,000 and 10,000 to 30,000 for hydrogenated diblocks.

If the molecular weight is the same, a blend of SI and SEBS or SEPS will have a lower viscosity than a blend of SEB or SEP with SEBS or SEPS but the blend with SI will exhibit the thermal, ultraviolet, and viscosity stability advantages of the hydrogenated triblocks used alone or in combination with hydrogenated diblocks—this is very surprising in that the polymer blend contains at least 60% of unsaturated polymer. This is illustrated in the examples.

If desired, these block copolymers may be hydrogenated. Unhydrogenated, partially hydrogenated, and fully hydrogenated polymers are included within the scope of this invention. Hydrogenation may be effected selectively as disclosed in U.S. Pat. Reissue No. 27,145 which is herein incorporated by reference. The hydrogenation of these copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference.

An adhesion promoting or tackifying resin that is compatible with the polymers should be used in the amount of from 75 to 275 parts by weight per hundred parts by weight of polymer. In the composition of the present invention, the preferred concentration range of the tackifying resin is narrower, from 100 pbw to 250 pbw, preferably 175 to 200, because at lower levels, the viscosity of the adhesive could be too high and at higher levels, the adhesive loses tack properties.

A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclopentadiene, 15 % 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2methyl-2-butene. The resins normally have ring and ball softening points as determined by ASTM method E28 between about 80° C. and 115° C.

There are a wide variety of tackifying resins which are compatible with these polymer blends and thus may be used. Certain tackifiers are chosen depending upon the polymers used or the desire for weatherability. For example, hydrogenated tackifiers are sometimes more compatible with hydrogenated polymers than are the commonly used unhydrogenated tackifiers and the weatherability of the formulation increases as the level of unsaturation decreases.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. Softening points of solid resins may be from about 40° C. to about 120° C. Liquid resins, i.e., softening points less than room temperature, may be used as well as combinations of solid and liquid resins.

A composition of the instant invention may contain plasticizers, such as rubber extending plasticizers, or compounding oils or organic or inorganic pigments and dyes. Rubber compounding oils are well-known in the art and include both high saturates content oils and naphthenic oils. Preferred plasticizers are highly saturated oils, e.g. Tufflo® 6056 and 6204 oil made by Arco and naphthenic process oils, e.g. Shellflex® 371 oil made by Shell. The amounts of rubber compounding oil employed in the invention composition can vary from 0 to 150 phr, preferably form 0 to 80 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition. Combinations of primary and secondary antioxidants are preferred. Such combinations include sterically hindered phenolics with phosphites or thioethers, such as hydroxyphenylpropionates with aryl phosphates or thioethers, or amino phenols with aryl phosphates. Specific examples of useful antioxidantcombinationsinclude3-(3,5-di-t-butyl-4-hydroxyphenyl)propionate)methane (Irganox® 1010 from Ciba-Geigy) with tris(nonylphenyl)-phosphite (Polygard® HR from Uniroyal), Irganox® 1010 with bis(2, 4-di-t-butyl)pentaerythritol diphosphite (Ultranox® 626 from Borg-Warner).

All compositions based on the polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive or sealant application. A formulator skilled in the art will see tremendous versatility in the polymers of this invention to prepare adhesives and having properties suitable for many different applications.

There are several advantages of using lower viscosity polymers in adhesives. First, the lower viscosity means that higher solids contents can be tolerated in solvent based formulations. This will reduce the volatile organic content of the formulation. Finally, and most important here, these compositions may contain 65% by weight solids or more and still be sufficiently processable (adhesive viscosity of 300 cps or less), allowing them the meet the 250 VOC requirement.

EXAMPLES

The fumigation adhesives described below which fall within the scope of this invention all exhibited destructive tear, had solids contents of 65 percent or greater, and a had viscosities of less than 300 cps. This is advantageous because they meet the VOC requirement and still create a strong bond between the layers of polyethylene. The hydrogenated polymer and hydrogenated resin-based adhesives exhibited good weatherability. Tear strength is the other important property for fumigation adhesives. If the layers can be pulled apart, the tear strength is insufficient. Tear strength is sufficient if when force is exerted to pull the layers apart (the method used in these examples), the whole film construction tears, i.e., the adhesive is stronger than the polyethylene layers.

EXAMPLE 1

Three fumigation adhesive formulations were tested. One used in unhydrogenated styrene butadiene styrene triblock copolymer having a molecular weight of 111,000 (Polymer A). Polymer B was an unhydrogenated styrene isoprene styrene triblock copolymer having a molecular weight of 160,000. Polymer C, the polymer of this invention, was a blend of 30 percent of KRATON® G1652 polymer which is a hydrogenated styrene butadiene styrene triblock copolymer having a molecular weight of about 50,000 with 70 percent by weight of LIQUID KRATON® LVSI-101, an unhydrogenated styrene isoprene diblock copolymer having a molecular weight of 30,000 and a styrene content of 15%. Each of these formulations contained 100 parts by weight of Polymer A, B, or C, 200 parts by weight of Escorez® 5380 (see Table 2), 162 parts by weight of solvent and small amounts of stabilizers and dye.

The weatherability of these adhesive formulations was tested for each by making a two layer polyethylene film 1 foot wide with sufficient edges that they could be grasped to try to pull the layers apart. Then, these film constructions are placed out in the desert sun. Periodically, someone goes out and tries to pull them apart. If the layers peel along the adhesive, then the failure in terms of weatherability of the polymer has occurred. If one tries to pull the layers apart and the polyethylene tears (destructive tear), then the adhesive is still functioning well. The following table shows the results.

TABLE 1

| | |
|---|---|
| Polymer A | 1–2 days |
| Polymer B | 2–3 days |
| Polymer C | 3–4 weeks |

It can be seen that the unhydrogenated polymers are drastically effected by the desert sun. The polymer blend of this invention lasts for three to four weeks. For comparison, the same formulation using only the hydrogenated triblock copolymer, a formula which is currently being used commercially, also lasts for three or four weeks. Most surprisingly and significantly, the blend of 70 percent unhydrogenated low molecular weight diblock with the hydrogenated triblock copolymer achieves the same results in terms of weatherability as does the hydrogenated block copolymer itself.

EXAMPLE 2

The following table describes the components which are used in the adhesive formulations in the following examples.

TABLE 2

| | |
|---|---|
| ESCOREZ® 5380 | A tackifying resin - hydrogenated dicylopentadiene copolymers |
| TINUVIN P® | UV blocker substituted hydroxyphenyl benzotriazole |
| TINUVIN 770® | UV blocker substituted hydroxyphenyl benzotriazole |
| IRGANOX® 1010 | Commonly used polymer antioxidant |
| SOLVENT RED | A dye |
| KRATON® G1726 Polymer | A hydrogenated styrene butadiene triblock copolymer which contains 70 percent uncoupled diblock arms - overall MW of about 50,000, diblock MW of 35,000 +, 30% styrene |
| KRATON® D1117 polymer | Unsaturated styrene isoprene triblock copolymer having a molecular weight of 129,000 and a styrene content of 17.4 percent |
| KRATON® D1107 | A styrene isoprene triblock copolymer having a molecular weight of 160,000 and a styrene content of about 15–20 percent |
| REGAL LIGHT® R91 Tackifying Resin | A hydrogenated tackifying resin of mixed aromatic monomers |
| KRATON® G1650 Polymer | A hydrogenated styrene butadiene triblock copolymer having a molecular weight of 67,000 and a styrene content of about 30 percent |
| WINGTACK® Resin | An unhydrogenated $C_5$ tackifying resin |
| KRATON® D1112 | An unsaturated styrene isoprene triblock copolymer having a molecular weight of about 165,000 and a polystyrene content of about 15 percent |
| Shell Sol B | Hexane |
| KRATON® G1652 Polymer | A hydrogenated styrene butadiene triblock copolymer having a molecular weight of 50,000 and a styrene content of about 30 percent |
| INDOPOL L-14 | An oil commonly used in adhesive formulations |
| Super Nevtac 99 | synthetic polyterpene resin |
| PICCOTEX® 120 Resin | Styrene, alpha methyl styrene, vinyl toluene resin |

The formulation shown in Table 2 below were tested according to the destructive tear test described in Example 1 above except that they were not subjected to the weatherability test. The VOC contents of many of the formulations were determined and the viscosities of many of the formulations were determined.

TABLE 3

| | A | B | C | D | E | F |
|---|---|---|---|---|---|---|
| Hexane | 98.2 | 98.2 | 98.2 | 98.2 | 98.2 | 412.6 |
| Acetone | 44.0 | 44.0 | 44.0 | 44.0 | 44.0 | 127.8 |
| Toluene | 19.5 | 19.5 | 19.5 | 19.5 | 19.5 | |
| Escorez 5380 | 200 | 200 | 200 | 200 | 200 | |
| Tinuvin P | 2.0 | 2.0 | 2.0 | 2.0 | 2.0 | 2.0 |
| Tinuvin 1770 | 1.0 | 1.0 | 1.0 | 1.0 | 1.0 | 1.0 |
| Irganox 1010 | 0.5 | 0.5 | 0.5 | 0.5 | 0.5 | 0.5 |
| Oil Red | 0.5 | 0.5 | 0.5 | 0.5 | 0.5 | 0.5 |
| LVSI-101 | 87.5 | 87.5 | 87.5 | 75.0 | 80 | 0 |
| G-1726 | 12.5 | 0 | 0 | 0 | 0 | 0 |
| G-1652 | 0 | 12.5 | 0 | 0 | 0 | 0 |
| D-1117 | 0 | 0 | 12.5 | 25.0 | 0 | 0 |
| D-1107 | 0 | 0 | 0 | 0 | 20.0 | 0 |
| Regalite R-91 | 0 | 0 | 0 | 0 | 0 | 200 |
| G-1650 | 0 | 0 | 0 | 0 | 0 | 100 |

Formulations A and B within the scope of the present invention had a viscosity of 158 cps and 202 cps and had VOC contents of 250 or less. The same is true of formulation C and D except that the viscosities were 114 cps and 200 cps. Formulation E also performed well. Formulation F performed well in the test but the VOC content is much too high as can be seen by looking at the total amount of solvent, hexane, acetone, and toluene.

TABLE 4

|  | A | B | C | D | E | F |
|---|---|---|---|---|---|---|
| Hexane | 98.2 | 0 | 102.2 | 135.1 | 102.2 | 135.1 |
| Shell Sol B | 0 | 98.2 | 0 | 0 | 0 | 0 |
| Acetone | 44 | 44 | 45.8 | 60.5 | 45.8 | 60.5 |
| Toluene | 19.5 | 19.5 | 20.3 | 26.9 | 20.3 | 26.9 |
| Escorez 5380 | 200 | 200 | 100 | 150 | 100 | 150 |
| Tinuvin P | 2 | 2 | 2 | 2 | 2 | 2 |
| Tinuvin 1770 | 1 | 1 | 1 | 1 | 1 | 1 |
| Irganox 1010 | 0.5 | 0.5 | 0.5 | 0.5 | 0.5 | 0.5 |
| Oil Red | 0.5 | 0.5 | 0.5 | 0.5 | 0.5 | 0.5 |
| G-1726 | 50 | 50 | 0 | 0 | 50 | 50 |
| LVSI-101 | 50 | 50 | 87.5 | 87.5 | 50 | 50 |
| Wingtack | 0 | 0 | 100 | 150 | 100 | 150 |
| D-1112 | 0 | 0 | 12.5 | 12.5 | 0 | 0 |

Formulation A formed a good initial adhesive bond but debonded after 87 hours. The viscosity was 330 cps. The same is true of formulation B. Formulation C gave good bonding and had a viscosity of 214. Formulation D failed because it contained a total of 300 parts of tackifying resin (150 parts ESCOREZ® 5380 and 150 parts Wingtack). Formulation E formed an initially good double bond but did not perform well in the weatherability test. The viscosity of this formulation was 330 cps. Formulation F failed because it peeled apart. The reason for this is it contained 300 parts of tackifying resin.

TABLE 5

|  | A | B | C |
|---|---|---|---|
| Hexane | 90.3 | 98.2 | 98.2 |
| Acetone | 44.0 | 44.0 | 44.0 |
| Toluene | 19.5 | 19.5 | 19.5 |
| Escorez 5380 | 200 | 200 | 200 |
| Tinuvin P | 2 | 2 | 2 |
| Tinuvin 1770 | 1 | 1 | 1 |
| Irganox 1010 | 0.5 | 0.5 | 0.5 |
| Oil Red | 0.5 | 0.5 | 0.5 |
| D-1107 | 12.5 | 0 | 0 |
| D1112 | 0 | 25 | 12.5 |
| LVSI 101 | 87.5 | 75 | 87.5 |

Formulation A bonded but other formulations had better bonding. Formulation B was somewhat stiff and the bond weakened after the weatherability test but the initial bond was good. Formulation C formed a good bond and was still performing well in the weatherability test after 50 hours. The viscosity was 220 cps.

TABLE 6

|  | A | B | C |
|---|---|---|---|
| Hexane | 70.3 | 70.3 | 70.3 |
| Acetone | 31.5 | 31.5 | 31.5 |
| Toluene | 14 | 14 | 14 |
| Escorez 5380 | 200 | 200 | 200 |
| Tinuvin P | 2 | 2 | 2 |
| Tinuvin 770 | 1 | 1 | 1 |
| Irganox 1010 | 0.5 | 0.5 | 0.5 |
| Solvent Red | 0.5 | 0.5 | 0.5 |
| D-1107 | 25 | 0 | 0 |
| D-1125 | 0 | 0 | 25 |
| LVSI-101 | 75 | 100 | 75 |
| Piccotex 120 | 0 | 50 | 0 |

Formulation A exhibited excellent adhesion. Formulation B failed in that the layers peeled apart due to the lack of any triblock. Formulation C performed well.

TABLE 7

|  | A | B | C | D | E | F |
|---|---|---|---|---|---|---|
| Hexane | 166.6 | 115.6 | 90.2 | 120.5 | 297.4 | 297.4 |
| Acetone | 51.7 | 35.8 | 40.5 | 54.1 | 92.2 | 92.2 |
| Escorez 5380 | 125 | 200 | 200 | 300 | 125 | 125 |
| Tinuvin P | 2 | 2 | 2 | 2 | 2 | 2 |
| Tinuvin 770 | 1 | 1 | 1 | 1 | 1 | 1 |
| Irganox 1010 | 0.5 | 0.5 | 0.5 | 0.5 | 0.5 | 0.5 |
| Sol. Red 24 | 0.5 | 0.5 | 0.5 | 0.5 | 0.5 | 0.5 |
| G-1726 | 100 | 100 | 100 | 100 | 0 | 0 |
| Indopol L-14 | 0 | 100 | 100 | 100 | 0 | 0 |
| Toluene | 0 | 0 | 18 | 24 | 0 | 0 |
| G-1652 | 0 | 0 | 0 | 0 | 100 | 0 |
| G-1650 | 0 | 0 | 0 | 0 | 0 | 100 |

The data in this table is presented for comparative purposes. All of the formulations failed for one reason or another. Formulation A failed because it did not contain enough lower molecular weight diblock with a low enough molecular weight. Formulation B failed for the same reason. Formulation C also failed and had a viscosity of 1550 cps initially which was lowered to 335 cps during processing. The VOC content was 299. Formulation D failed because the viscosity was 400 cps. Formulation E failed even though the viscosity was 126 cps because the VOC content was 504. Formulation F failed because the viscosity was 434 cps and the VOC content was 504. None of these had any of the low molecular weight diblock which is a key element of the present invention.

TABLE 8

|  | A | B | C | D | E | F | G |
|---|---|---|---|---|---|---|---|
| Hexane | 90.4 | 90.4 | 90.4 | 412.6 | 412.6 | 412.6 | 412.6 |
| Acetone | 28.0 | 28.0 | 28.0 | 127.8 | 127.8 | 127.8 | 127.8 |
| Escorez 5380 | 200 | 200 | 200 | 200 | 100 | 200 | 100 |
| Tinuvin P | 2 | 2 | 2 | 2 | 2 | 2 | 2 |
| Tinuvin 770 | 1 | 1 | 1 | 1 | 1 | 1 | 1 |
| Irganox 1010 | 0.5 | 0.5 | 0.5 | 0.5 | 0.5 | 0.5 | 0.5 |
| Oil Red | 0.5 | 0.5 | 0.5 | 0.5 | 0.5 | 0.5 | 0.5 |
| G-1652 | 0 | 0 | 50 | 100 | 100 | 0 | 0 |
| G-1650 | 0 | 0 | 0 | 0 | 0 | 100 | 100 |
| G-1726 | 50 | 0 | 0 | 0 | 0 | 0 | 0 |
| TKG-101 | 0 | 50 | 0 | 0 | 0 | 0 | 0 |
| LVSI-101 | 50 | 50 | 50 | 0 | 0 | 0 | 0 |
| Super Nevtac 99 | 0 | 0 | 0 | 0 | 100 | 0 | 100 |

Formulation A had 250 VOC and performed very well. The same is true of formulation C. Formulations D, E, F, and G failed because the VOC contents were 500.

TABLE 9

|  | A | B | C | D | E | F |
|---|---|---|---|---|---|---|
| Hexane | 98.2 | 98.2 | 98.2 | 98.2 | 98.2 | 412.6 |
| Acetone | 44.0 | 44.0 | 44.0 | 44.0 | 44.0 | 127.8 |
| Toluene | 19.5 | 19.5 | 19.5 | 19.5 | 19.5 | 0 |
| Escorez 5380 | 200 | 200 | 200 | 200 | 200 | 0 |
| Tinuvin P | 2.0 | 2.0 | 2.0 | 2.0 | 2.0 | 2.0 |
| BLS 1770 | 1.0 | 1.0 | 1.0 | 1.0 | 1.0 | 1.0 |
| Irganox 1010 | 0.5 | 0.5 | 0.5 | 0.5 | 0.5 | 0.5 |
| Oil Red | 0.5 | 0.5 | 0.5 | 0.5 | 0.5 | 0.5 |
| LVSI-101 | 87.5 | 87.5 | 87.5 | 75.0 | 80 | 0 |
| G-1726 | 12.5 | 0 | 0 | 0 | 0 | 0 |
| G-1652 | 0 | 12.5 | 0 | 0 | 0 | 0 |
| D-1117 | 0 | 0 | 12.5 | 25.0 | 0 | 0 |

TABLE 9-continued

|           | A | B | C | D | E  | F   |
|-----------|---|---|---|---|----|-----|
| D-1107    | 0 | 0 | 0 | 0 | 20 | 0   |
| Regalite R-91 | 0 | 0 | 0 | 0 | 0  | 200 |
| G-1650    | 0 | 0 | 0 | 0 | 0  | 100 |

Formulations A and B performed very well and had viscosities of 158 cps and 202 cps. Formulations C and D performed well enough but not as good as formulations A and B. Formulations C and D had viscosities of 114 cps and 200 cps. Formulation E performed well. Formulation F also performed well but the VOC content was much too high due to the large amount of solvent.

TABLE 10

|              | A    | B    | C     | D     | E     | F     |
|--------------|------|------|-------|-------|-------|-------|
| Hexane       | 98.2 | 0    | 102.2 | 135.1 | 102.2 | 135.1 |
| Shell Sol B  | 0    | 98.2 | 0     | 0     | 0     | 0     |
| Acetone      | 44   | 44   | 45.8  | 60.5  | 45.8  | 60.5  |
| Toluene      | 19.5 | 19.5 | 20.3  | 26.9  | 20.3  | 26.9  |
| Escorez 5380 | 200  | 200  | 100   | 150   | 100   | 150   |
| Tinuvin P    | 2    | 2    | 2     | 2     | 2     | 2     |
| Tinuvin 770  | 1    | 1    | 1     | 1     | 1     | 1     |
| Irganox 1010 | 0.5  | 0.5  | 0.5   | 0.5   | 0.5   | 0.5   |
| Oil Red      | 0.5  | 0.5  | 0.5   | 0.5   | 0.5   | 0.5   |
| G-1726       | 50   | 50   | 0     | 0     | 50    | 50    |
| LVSI-101     | 50   | 50   | 87.5  | 87.5  | 50    | 50    |
| Wingtack     | 0    | 0    | 100   | 150   | 100   | 150   |
| D-1112       | 0    | 0    | 12.5  | 12.5  | 0     | 0     |

Formulation A had a good initial bond but the bond failed after 87 hours in the weatherability test. The viscosity of the formulation was 330 cps as was the viscosity of formulation B for which the results were the same. Formulation C performed well. Its viscosity was 214. Formulation D failed because it peeled apart rather than exhibit destructive tear. This is because it contained too much tackifying resin. Formulation E had reasonably good results initially but failed after 60 hours. The viscosity was 330 cps. Formulation D failed by peeling apart because too much tackifying resin was used (300 parts).

TABLE 11

|              | A    | B    | C    |
|--------------|------|------|------|
| Hexane       | 90.3 | 98.2 | 98.2 |
| Acetone      | 44.0 | 44.0 | 44.0 |
| Toluene      | 19.5 | 19.5 | 19.5 |
| Escorez 5380 | 200  | 200  | 200  |
| Tinuvin P    | 2    | 2    | 2    |
| Tinuvin 770  | 1    | 1    | 1    |
| Irganox 1010 | 0.5  | 0.5  | 0.5  |
| Oil Red      | 0.5  | 0.5  | 0.5  |
| D-1107       | 12.5 | 0    | 0    |
| D-1112       | 0    | 25   | 12.5 |
| LVSI-1101    | 87.5 | 75   | 87.5 |

Formulation A performed reasonably well but the bond was not as good as other formulations. Formulation B performed well initially but weakened during the weatherability test. Formulation C performed well and still was performing well after 50 hours in the weatherability test.

TABLE 12

|              | A    | B    | C    | D    | E    | F     | G     |
|--------------|------|------|------|------|------|-------|-------|
| Hexane       | 70.3 | 70.3 | 70.3 | 70.3 | 98.2 | 412.6 | 412.6 |
| Acetone      | 31.5 | 31.5 | 31.5 | 31.5 | 44.0 | 127.8 | 127.8 |
| Toluene      | 14   | 14   | 14   | 14   | 19.5 | 0     | 0     |
| Escorez 5380 | 200  | 200  | 200  | 200  | 200  | 200   | 200   |
| Tinuvin P    | 2.0  | 2.0  | 2.0  | 2.0  | 2.0  | 2.0   | 2.0   |
| Tinuvin 770  | 1.0  | 1.0  | 1.0  | 1.0  | 1.0  | 1.0   | 1.0   |
| Irganox 1010 | 0.5  | 0.5  | 0.5  | 0.5  | 0.5  | 0.5   | 0.5   |
| Solvent Red  | 0.5  | 0.5  | 0.5  | 0.5  | 0.5  | 0.5   | 0.5   |
| D-1107       | 25   | 0    | 0    | 0    | 25   | 0     | 0     |
| D-1125       | 0    | 0    | 25   | 0    | 0    | 0     | 0     |
| LVSI-101     | 75   | 100  | 75   | 75   | 75   | 0     | 0     |
| Piccotex 120 | 0    | 50   | 0    | 0    | 0    | 0     | 0     |
| G-1652       | 0    | 0    | 0    | 25   | 0    | 0     | 0     |
| G-1650       | 0    | 0    | 0    | 0    | 0    | 100   | 100   |

Formulations A, C, and D performed very well. Formulation B failed by peeling because it contained no triblock polymer. Formulation E performed well but formulation F failed because the VOC content was too high and solids content was too low. Formulation G failed for the same reason as formulation F.

We claim:

1. A low viscosity, low volatile organics content fumigation adhesive composition which has at least 65% by weight solids, said composition comprising:

a) 100 parts by weight (pbw) of a blend of a hydrogenated styrene-diene triblock copolymer, having a weight average molecular weight of 30,000 to 60,000 and a polystyrene content of from 10 to 40% by weight of the polymer, and an unhydrogenated styrene-diene diblock copolymer having a weight average molecular weight of 10,000 to 40,000 and a polystyrene content of from 10 to 40% by weight of the polymer, wherein the diblock comprises from 60 to 95% by weight of the polymer blend, b) 75 to 275 parts by weight (pbw) of a tackifying resin which is compatible with the diene blocks, and c) 50 to 200 parts by weight (pbw) of a solvent for the polymer.

2. The adhesive of claim 1 wherein the diene in the diblock is isoprene.

3. The adhesive of claim 2 wherein the diblock comprises from 75 to 85% by weight of the polymer blend.

4. The adhesive of claim 3 wherein the polystyrene content of the diblock ranges from 15 to 20% by weight of the polymer blend and the polystyrene content of the triblock ranges from 15 to 30% of the polymer blend.

5. The adhesive of claim 1 wherein the amount of tackifying resin ranges from 100 to 250 parts by weight.

6. The adhesive of claim 5 wherein the amount of tackifying resin ranges from 175 to 200 parts by weight.

7. A low viscosity, low volatile organics content fumigation adhesive composition which has at least 65% by weight solids, said composition comprising:

a) 100 parts by weight (pbw) of a blend of an unhydrogenated styrene-diene triblock copolymer, having a weight average molecular weight of 30,000 to 125,000 and a polystyrene content of from 10 to 40% by weight of the polymer, and an unhydrogenated styrene-diene diblock copolymer having a weight average molecular weight of 10,000 to 40,000 and a polystyrene content of from 10 to 40% by weight of the polymer, wherein the diblock comprises from 60 to 95% by weight of the polymer blend, b) 75 to 275 parts by weight (pbw) of a tackifying resin which is compatible with the diene blocks, and c) 50 to 200 parts by weight (pbw) of a solvent for the polymer.

8. The adhesive of claim 7 wherein the diene in the diblock is isoprene.

9. The adhesive of claim 8 wherein the amount of diblock in the polymer blend ranges from 75 to 85% by weight of the blend.

10. The adhesive of claim 9 wherein the polystyrene content of the diblock ranges from 15 to 20% by weight of the polymer blend and the polystyrene content of the triblock ranges from 15 to 30% of the polymer blend.

11. The adhesive of claim 7 wherein the amount of tackifying resin ranges from 100 to 250 parts by weight.

12. The adhesive of claim 11 wherein the amount of tackifying resin ranges from 175 to 200 parts by weight.

13. A low viscosity, low volatile organics content fumigation adhesive composition which has at least 65% by weight solids, said composition comprising:

a) 100 parts by weight (pbw) of a blend of an unhydrogenated styrene-diene triblock copolymer having a weight average molecular weight of greater than 125,000 to 200,000 and a polystyrene content of from 10 to 40% by weight of the polymer, and an unhydrogenated styrene-diene diblock copolymer having a weight average molecular weight of 10,000 to 40,000 and a polystyrene content of from 10 to 40% by weight of the polymer, wherein the diblock comprises from 80 to 95% by weight of the polymer blend, b) 75 to 275 parts by weight (pbw) of a tackifying resin which is compatible with the diene blocks, and c) 50 to 200 parts by weight (pbw) of a solvent for the polymer.

14. The adhesive of claim 13 wherein the diene in the diblock is isoprene.

15. The adhesive of claim 14 wherein the polystyrene content of the diblock ranges from 15 to 20% by weight of the polymer blend and the polystyrene content of the triblock ranges from 15 to 30% of the polymer blend.

16. The adhesive of claim 13 wherein the amount of tackifying resin ranges from 100 to 250 parts by weight.

17. The adhesive of claim 16 wherein the amount of tackifying resin ranges from 175 to 200 parts by weight.

18. A low viscosity, low volatile organics content fumigation adhesive composition which has at least 65% by weight solids, said composition comprising:

a) 100 parts by weight (pbw) of a blend of an unhydrogenated styrene-diene triblock copolymer having a weight average molecular weight of greater than 125,000 to 200,000 and a polystyrene content of from 10 to 40% by weight of the polymer, and a hydrogenated styrene-diene diblock copolymer having a weight average molecular weight of 10,000 to 40,000 and a polystyrene content of from 10 to 40% by weight of the polymer, wherein the diblock comprises from 80 to 95% by weight of the polymer blend, b) 75 to 275 parts by weight (pbw) of a tackifying resin which is compatible with the diene blocks, and c) 50 to 200 parts by weight (pbw) of a solvent for the polymer.

19. The adhesive of claim 18 wherein the diene in the diblock is isoprene.

20. The adhesive of claim 19 wherein the polystyrene content of the diblock ranges from 15 to 20% by weight of the polymer blend and the polystyrene content of the triblock ranges from 15 to 30% of the polymer blend.

21. The adhesive of claim 19 wherein the amount of tackifying resin ranges from 100 to 250 parts by weight.

22. The adhesive of claim 21 wherein the amount of tackifying resin ranges from 175 to 200 parts by weight.

23. A low viscosity, low volatile organics content fumigation adhesive composition which has at least 65% by weight solids, said composition comprising:

a) 100 parts by weight (pbw) of a blend of an unhydrogenated styrene-diene triblock copolymer, having a weight average molecular weight of 30,000 to 125,000 and a polystyrene content of from 10 to 40% by weight of the polymer, and a hydrogenated styrene-diene diblock copolymer having a weight average molecular weight of 10,000 to 40,000 and a polystyrene content of from 10 to 40% by weight of the polymer, wherein the diblock comprises from 60 to 95% by weight of the polymer blend, b) 75 to 275 parts by weight (pbw) of a tackifying resin which is compatible with the diene blocks, and c) 50 to 200 parts by weight (pbw) of a solvent for the polymer.

24. The adhesive of claim 23 wherein the diene in the diblock is isoprene.

25. The adhesive of claim 24 wherein the amount of diblock in the polymer blend ranges from 75 to 85% by weight of the blend.

26. The adhesive of claim 25 wherein the polystyrene content of the diblock ranges from 15 to 20% by weight of the polymer blend and the polystyrene content of the triblock ranges from 15 to 30% of the polymer blend.

27. The adhesive of claim 23 wherein the amount of tackifying resin ranges from 100 to 250 parts by weight.

28. The adhesive of claim 27 wherein the amount of tackifying resin ranges from 175 to 200 parts by weight.

29. A low viscosity, low volatile organics content fumigation adhesive composition which has at least 65% by weight solids, said composition comprising:

a) 100 parts by weight (pbw) of a blend of a hydrogenated styrene-diene triblock copolymer, having a weight average molecular weight of 30,000 to 60,000 and a polystyrene content of from 10 to 40% by weight of the polymer, and a hydrogenated styrene-diene diblock copolymer having a weight average molecular weight of 10,000 to 30,000 and a polystyrene content of from 10 to 40% by weight of the polymer, wherein the diblock comprises from 60 to 95% by weight of the polymer blend, b) 75 to 275 parts by weight (pbw) of a tackifying resin which is compatible with the diene blocks, and c) 50 to 200 parts by weight (pbw) of a solvent for the polymer.

30. The adhesive of claim 29 wherein the diene in the diblock is isoprene.

31. The adhesive of claim 30 wherein the amount of diblock in the polymer blend ranges from 75 to 85% by weight of the blend.

32. The adhesive of claim 31 wherein the polystyrene content of the diblock ranges from 15 to 20% by weight of the polymer blend and the polystyrene content of the triblock ranges from 15 to 30% of the polymer blend.

33. The adhesive of claim 29 wherein the amount of tackifying resin ranges from 100 to 250 parts by weight.

34. The adhesive of claim 33 wherein the amount of tackifying resin ranges from 175 to 200 parts by weight.

* * * * *